(12) United States Patent
Bafna et al.

(10) Patent No.: US 12,015,345 B2
(45) Date of Patent: Jun. 18, 2024

(54) PULSE WIDTH MODULATION TECHNIQUES FOR A MULTIPHASE VOLTAGE CONVERTER

(71) Applicant: TEXAS INSTRUMENTS INCORPORATED, Dallas, TX (US)

(72) Inventors: Naman Bafna, Balaghat (IN); Preetam Charan Anand Tadeparthy, Yelaankha Hobli (IN); Ammineni Balaji, Andhra Pradesh (IN); Sreelakshmi Suresh, Kundalahalli Gate (IN); Mayank Jain, Haryana (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/229,755

(22) Filed: Aug. 3, 2023

(65) Prior Publication Data
US 2023/0378869 A1    Nov. 23, 2023

Related U.S. Application Data

(63) Continuation of application No. 17/490,671, filed on Sep. 30, 2021, now Pat. No. 11,757,358.

(30) Foreign Application Priority Data

Jun. 7, 2021    (IN) .............................. 202141025315

(51) Int. Cl.
*H02M 3/157*    (2006.01)
*H02M 1/00*    (2006.01)
*H02M 1/084*    (2006.01)

(52) U.S. Cl.
CPC ......... *H02M 3/157* (2013.01); *H02M 1/0009* (2021.05); *H02M 1/0845* (2013.01)

(58) Field of Classification Search
CPC ... H02M 3/157; H02M 1/0009; H02M 1/0845
See application file for complete search history.

(56) References Cited

U.S. PATENT DOCUMENTS 6,307,356 B1    10/2001    Dwelley
7,656,141 B1 *    2/2010    Granat .................. H02M 3/158
                                                        323/284

(Continued)

FOREIGN PATENT DOCUMENTS

KR    1020130080293 A    7/2013
KR    1020210027906 A    3/2021

OTHER PUBLICATIONS

International Search Report dated Sep. 28, 2022.
1020130080293KR Machine translation.
1020210027906 Machine translation.

*Primary Examiner* — Jue Zhang
*Assistant Examiner* — Lakaisha Jackson
(74) *Attorney, Agent, or Firm* — Michelle F. Murray; Frank D. Cimino (57) ABSTRACT

In an example, a method includes storing a pending PWM pulse for a switching voltage regulator. The method also includes determining a switching voltage regulator is operating in a current limit mode, where an inductor current is above a current limit threshold. The method includes providing a predetermined number of PWM pulses in the current limit mode. The method also includes, responsive to providing the predetermined number of PWM pulses, ceasing storage of pending PWM pulses for the switching voltage regulator.

20 Claims, 9 Drawing Sheets

(56) References Cited

U.S. PATENT DOCUMENTS

| | | | |
|---|---|---|---|
| 7,764,054 B1 | 7/2010 | Guo et al. | |
| 2012/0200274 A1 | 8/2012 | Tang et al. | |
| 2015/0357913 A1* | 12/2015 | Tschirhart | H02M 3/156 323/282 |
| 2018/0323723 A1* | 11/2018 | Mochizuki | H02M 1/143 |
| 2023/0035151 A1* | 2/2023 | Balaji | H02M 3/1566 |

* cited by examiner

PULSE WIDTH MODULATION TECHNIQUES FOR A MULTIPHASE VOLTAGE CONVERTER

CROSS-REFERENCE TO RELATED APPLICATIONS

The present application is a continuation of U.S. patent application Ser. No. 17/490,671 filed Sep. 30, 2021, which claims priority to Indian Patent Application No. 202141025315, which was filed Jun. 7, 2021, is titled "PWM State Machine Techniques for a Multiphase Switching Buck Regulator to Improve Transient Performa," both of which are hereby incorporated herein by reference in their entirety.

BACKGROUND

Switching voltage regulators (also called switching voltage converters) in electronic systems receive an input voltage and input current and provide an output voltage and output current for operating components in the electronic system. In operation, a switching voltage regulator turns power transistors, which are metal-oxide semiconductor field effect transistors (MOSFETs) in some examples, on and off rapidly in order to provide the output voltage and output current. A controller provides pulse width modulation (PWM) signals to the power transistors to control the on and off state of the transistors. The switching voltage regulator may be a buck converter, a boost converter, or a buck-boost converter. The switching voltage regulator may be a multiphase regulator that has a parallel set of power stages, each power stage with its own inductor and power MOSFETs.

SUMMARY

In accordance with at least one example of the description, a method includes storing a pending PWM pulse for a switching voltage regulator. The method also includes determining a switching voltage regulator is operating in a current limit mode, where an inductor current is above a current limit threshold. The method includes providing a predetermined number of PWM pulses in the current limit mode. The method also includes, responsive to providing the predetermined number of PWM pulses, ceasing storage of pending PWM pulses for the switching voltage regulator.

In accordance with at least one example of the description, a method includes determining an output voltage of a switching voltage regulator exceeds a programmed value. The method also includes determining an inductor current is less than zero amperes in the switching voltage regulator. The method includes tri-stating a PWM pulse responsive to determining the inductor current is less than zero amperes. The method also includes responsive to the inductor current being equal to or greater than zero amperes, providing a non-tri-state PWM pulse.

In accordance with at least one example of the description, a method includes determining an overshoot condition has occurred in a switching voltage regulator, where the overshoot condition indicates an output voltage has crossed a predetermined threshold. The method also includes providing a truncated PWM pulse, where the truncated PWM pulse includes a predetermined on-time. The method includes responsive to determining the overshoot condition is finished, providing a non-truncated PWM pulse.

DETAILED DESCRIPTION

In a multiphase switching voltage regulator, a controller controls multiple power stages. In each power stage, high-side and low-side field effect transistors (FETs) receive PWM signals from the controller, which control the on and off states of the FETs. The FETs power a load, which may be a central processing unit (CPU), graphics processing unit (GPU), or another electronic device. The switching voltage regulator may have a narrow tolerance band for the output voltage it produces. The output voltage is subject to load transients, where a change in the activity level of the load causes the transients. The switching voltage regulator has to maintain the output voltage within a certain tolerance band under these transient conditions. If the output voltage overshoots, the load may be damaged. If the output voltage undershoots, data may be corrupted at the load or the load may shut down. The controller is programmed to interact with the power stages to maintain the output voltage.

Three scenarios are described in the examples herein. In the first scenario, the power stages in a switching voltage regulator provide power to the load. If the load current rises, the controller provides additional PWM pulses to the power stages. The inductors may carry a large amount of current. If the load current drops, the energy stored in the inductors is transferred to an output capacitor, and the output voltage begins to increase. Therefore, the output voltage may overshoot the programmed final value, and then settle on the programmed final value. The overshoot may be caused by extra PWM pulses from the controller that are produced after the load current drops. The extra PWM pulses are caused by storing pending signals that provide extra PWM pulses. The pending signals are stored to provide the extra PWM pulses in the event that a load increase occurs to avoid a delay in providing PWM pulses. However, as described above, the extra PWM pulses may cause an overshoot of the output voltage. In examples herein, in some circumstances the pending signals that cause the extra PWM pulses are not stored but rather are removed. Removing these pending signals reduces the extra PWM pulses after the load current drops, which reduces overshoot of the output voltage.

In the second scenario, the output voltage may overshoot the regulation point if the load is released. The controller may keep the PWM signal low after the load release to discharge the output capacitor. However, this process may result in build-up of a negative current in the inductor. The negative current may impact the overshoot or the undershoot of the output voltage. Also, in a multiphase system, certain phases may have higher negative currents than other phases. In examples herein, the PWM pulses are tri-stated if the inductor current reaches zero after an output voltage overshoot. A tri-state PWM pulse has a voltage level between the high level and the low level. Tri-state PWM pulses continue if the inductor current is at zero or below. The tri-state PWM mode continues until all of the phases have provided two consecutive PWM pulses without a tri-state pulse in between. Responsive to that condition, the tri-state mode may end, and the normal PWM mode may resume.

In the third scenario, overshoot detection comparators may detect overshoot of the output voltage and notify the controller so the controller can take actions to prevent overshoot of the output voltage. The controller may tri-state the PWM pulses, truncate PWM pulses, prevent new PWM pulses, and/or remove pending PWM pulses. In some systems, the overshoot detection comparator may provide a fast notification to the controller, and the controller may stop the PWM pulses. A system with a high output capacitance may create an undershoot in the output voltage until the output voltage settles to its programmed final value. If all PWM pulses are halted, an undershoot may occur. If not enough PWM pulses are halted, an overshoot may occur. In examples herein, active pulse truncation is performed to reduce both overshoot and undershoot. In an overshoot situation, the controller still provides PWM pulses, but the PWM pulses have a programmable on time $T_{ON}$ that is less than the regular on time for PWM pulses. The on time $T_{ON}$ may be programmed to shape the output voltage based on the details of the application. Examples with active pulse truncation may settle the output voltage to the programmed final value faster than examples without active pulse truncation.

Examples herein describe a buck converter for the various scenarios. The examples are not limited to a buck converter, however, and the examples may also apply to a boost converter, a buck-boost converter, or any other type of switching regulator. The same reference numbers or other reference designators are used in the drawings to designate the same or similar (functionally and/or structurally) features.

Figure 1:
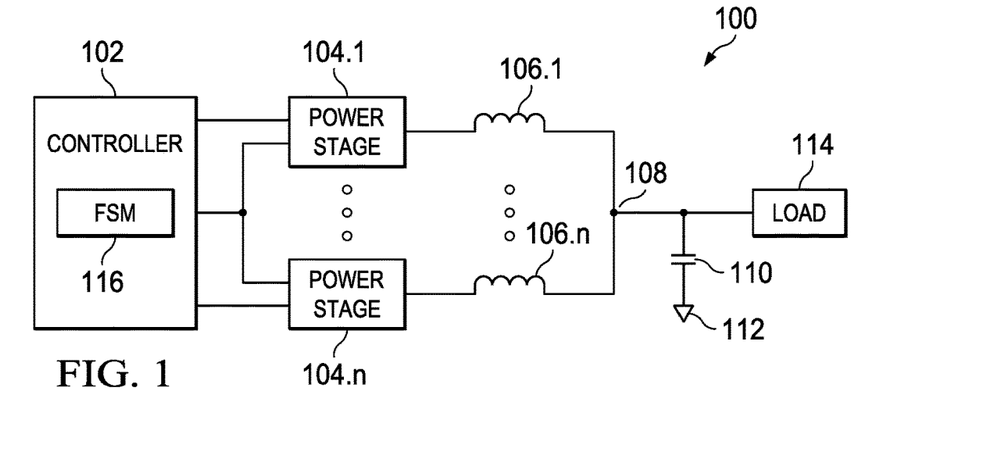
FIG. 1 is a system for a multiphase voltage regulator in accordance with various examples.

FIG. 1 is a system 100 for a multiphase voltage regulator in accordance with various examples herein. System 100 includes a controller 102, power stages 104.1 to 104.n (collectively, power stages 104), inductors 106.1 to 106.n (collectively, inductors 106), node 108, capacitor 110, ground node 112, and load 114. Controller 102 may include a finite state machine (FSM) 116. Any number of power stages 104 may be included in examples herein. Each power stage 104 is coupled to an inductor 106. An output voltage is provided to the load 114 at node 108. System 100 may be any type of switching voltage regulator, such as a buck regulator or a boost regulator.

Controller 102 is coupled to each of the power stages 104. Controller 102 provides PWM pulses to the power stages 104. Controller 102 may also provide voltages or other signals to power stages 104. Power stages 104 may provide feedback to controller 102. Power stages 104 may each manage a phase of a multiphase switching voltage regulator. The power stages 104 provide an output voltage and output current to a load 114. In examples herein, FSM 116 provides PWM techniques to maintain the output voltage within a certain tolerance band under the transient conditions. The details of the FSM techniques are described below.

Figure 2A:
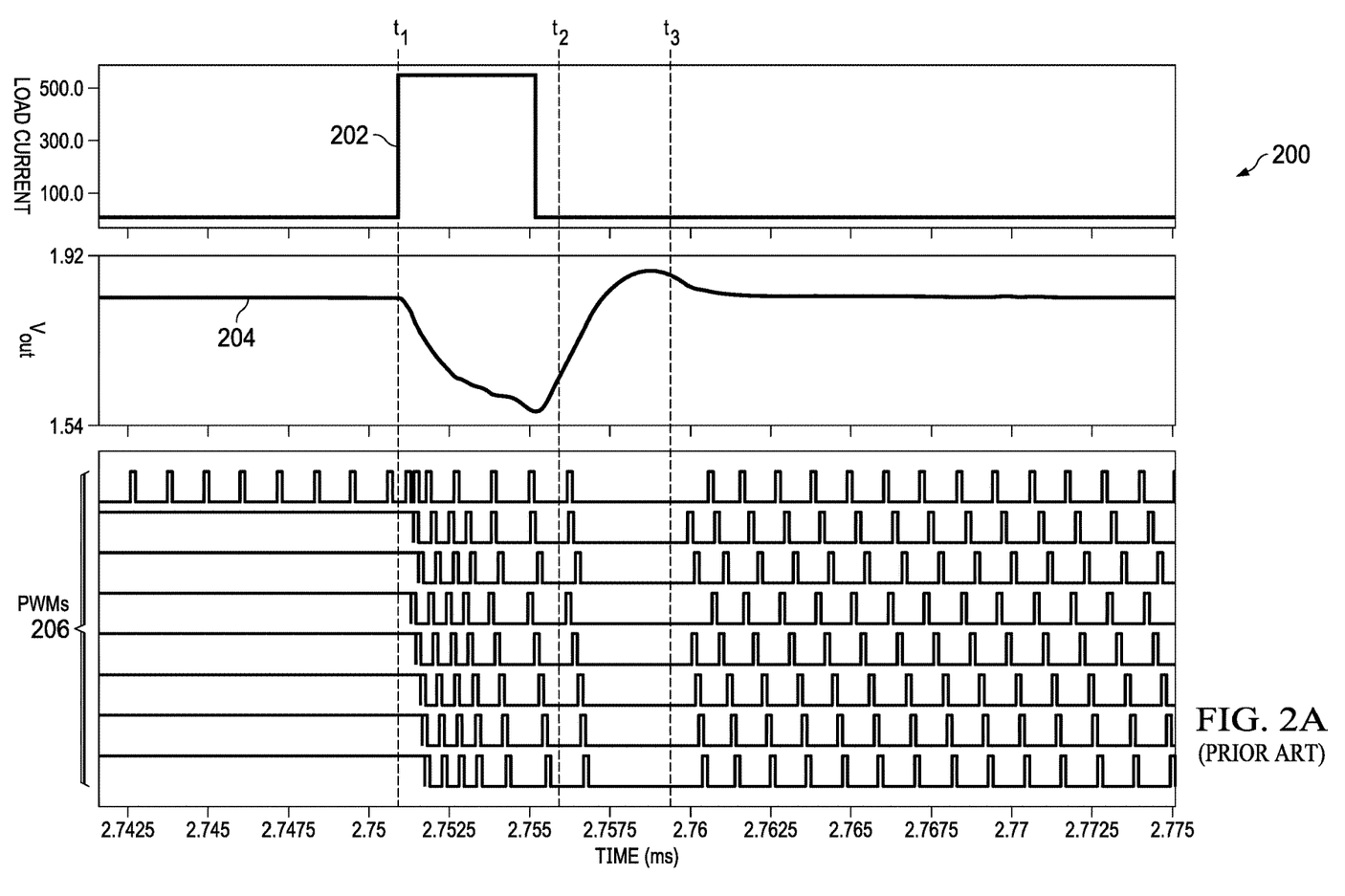
FIGS. 2A, 2B and 2C are waveforms for a switching voltage regulator in accordance with various examples.

FIG. 2A is a collection of waveforms 200 that show the first scenario described above. In the first scenario, waveform 202 represents the load current. Waveform 204 represents the output voltage $V_{out}$, and waveforms 206 represent a collection of PWM pulses for phases of a multiphase voltage regulator. At time $t_1$, the load current increases, and stays at a higher level until time $t_2$, at which time the load current drops. In one example, the load current may increase from approximately 60 A to approximately 520 A at time $t_1$. The load current may increase at a rate of 1080 A per microsecond or higher in some examples. The time from $t_1$ to $t_2$ may be approximately 500 nanoseconds in one example. If the load current is at the high level between times $t_1$ and $t_2$, the inductors (such as inductors 106) coupled to the power stages (such as power stages 104) may carry more than 500 A of current. At time $t_2$, after the load current drops, energy is transferred to a capacitor (such as capacitor 110), and $V_{out}$ begins to increase. $V_{out}$ may overshoot and then settle on the final programmed value. As shown in waveform 204, $V_{out}$ overshoots the final value between times $t_2$ and $t_3$.

Waveforms 206 show that PWM pulses are mostly paused between times $t_2$ and $t_3$. However, the PWM pulses are not stopped quickly enough in some examples and therefore some pulses are provided shortly after time $t_2$ and before time $t_3$. These extra PWM pulses between times $t_2$ and $t_3$ cause the overshoot of $V_{out}$. The extra PWM pulses are caused by storing pending signals that provide the extra PWM pulses after the load current drops. In examples described below, in some circumstances the pending signals that cause the extra PWM pulses are not stored but rather are removed. Removing these pending signals reduces the extra PWM pulses after the load current drops at time $t_2$, which reduces overshoot of $V_{out}$.

Figure 2B:
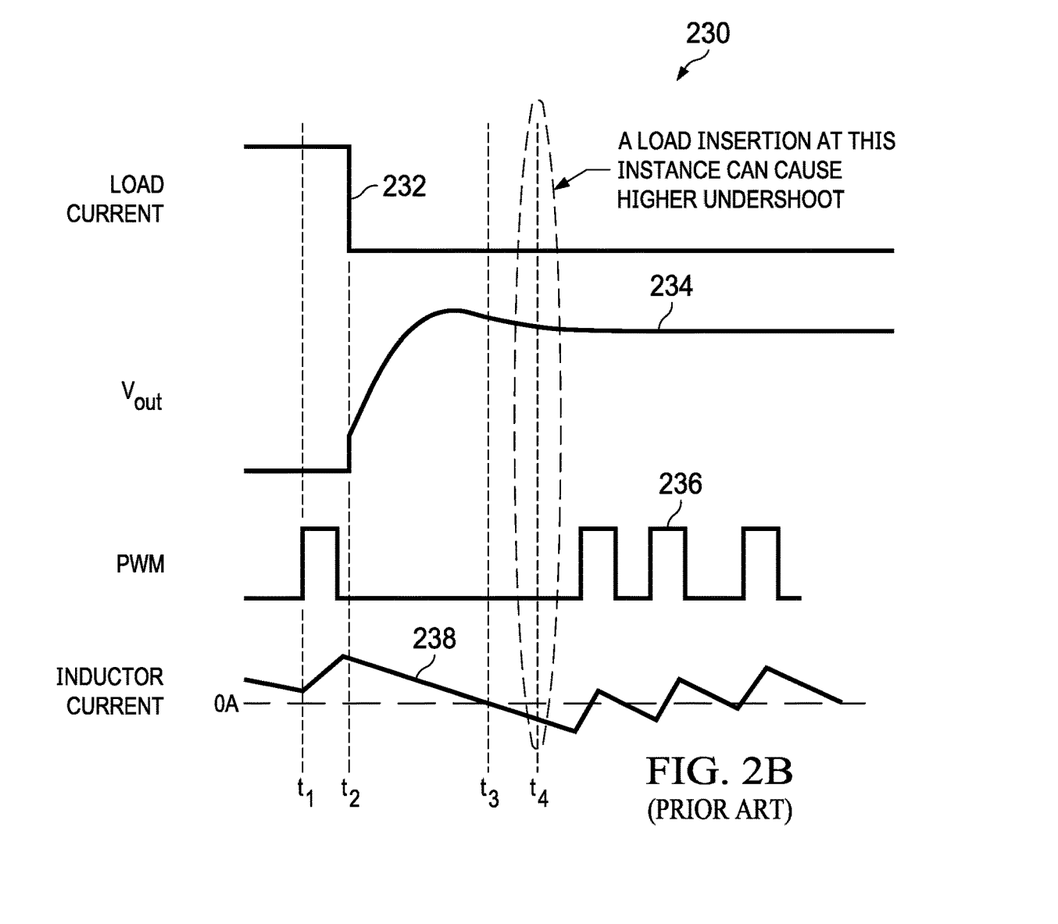

FIG. 2B is a collection of waveforms 230 for a switching voltage regulator in the second scenario described above. Waveform 232 represents the load current and waveform 234 represents $V_{out}$. Waveform 236 represents the PWM pulses from a controller (e.g., controller 102), and waveform 238 represents the inductor current. At time $t_1$, a PWM pulse goes high, and the inductor current begins to rise. At time $t_2$, the load current drops, and $V_{out}$ begins to rise. Also, at time $t_2$, the inductor current begins to fall. As shown in waveform 234, the $V_{out}$ overshoots the programmed final value. To bring $V_{out}$ to the programmed final value, current is sunk from the low-side FET in the switching voltage regulator. This process causes the inductor current to go below zero amps at time $t_3$. Negative inductor currents may reduce FET reliability in some examples. Also, a load insertion at or near time $t_4$ may cause an undershoot of $V_{out}$.

Figure 2C:
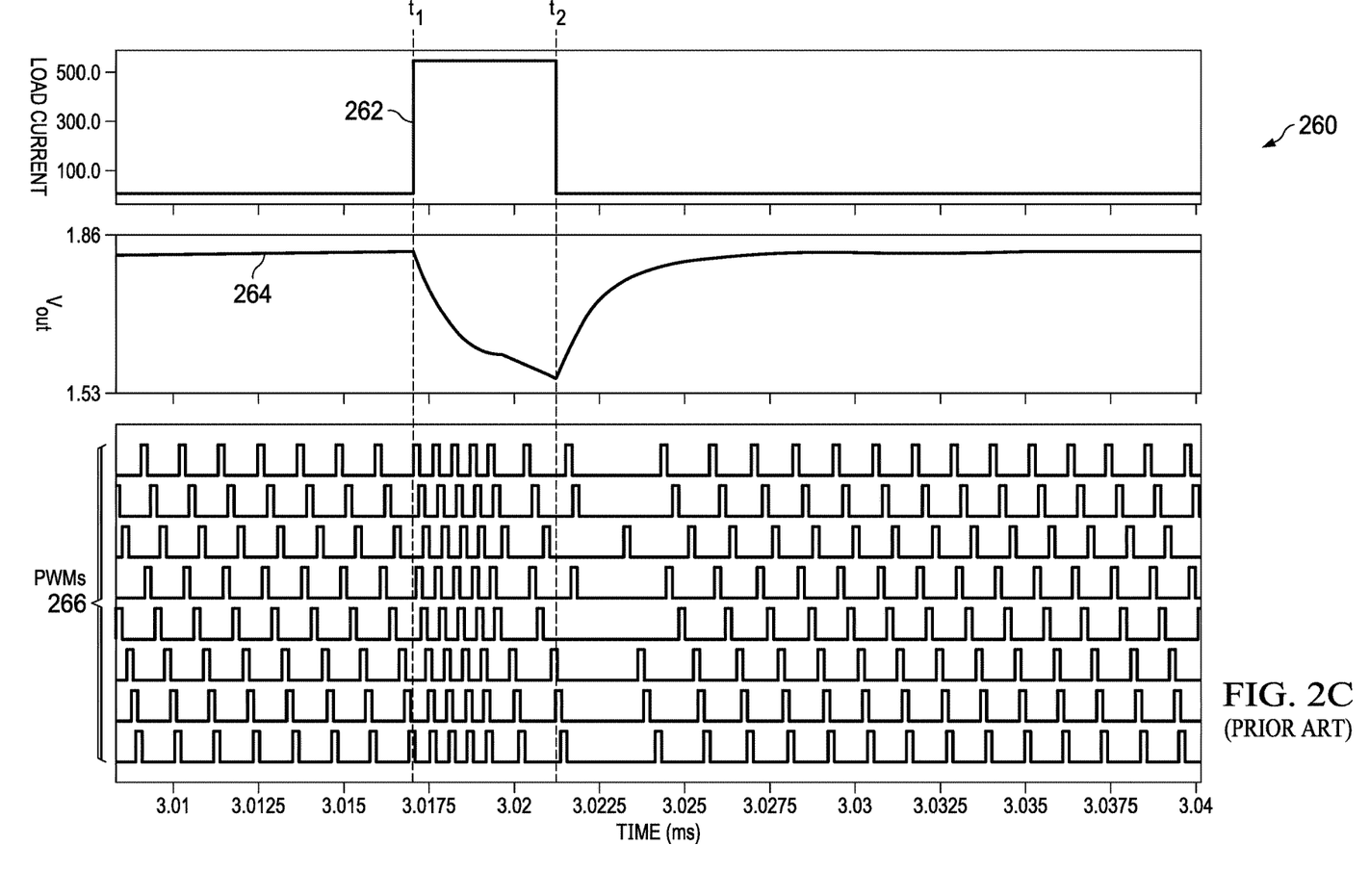

FIG. 2C is a collection of waveforms 260 for a switching voltage regulator in the third scenario described above. Waveform 262 represents the load current and waveform 264 represents $V_{out}$. Waveform 266 represents the PWM pulses from a controller (e.g., controller 102). At time $t_1$, the load current increases, and stays at a higher level until time $t_2$. The load current drops at time $t_2$. In one example, the load current may increase from approximately 60 A to approximately 520 A at time $t_1$. At time $t_1$, $V_{out}$ drops, and at time $t_2$ $V_{out}$ begins to increase. In this example, before $V_{out}$ reaches the final programmed value, the controller 102 provides more PWM pulses. The energy in the inductors 106 was not sufficient for $V_{out}$ to reach the final programmed value. The control loop has to perform extra work in this example, and $V_{out}$ has a slow settling response.

Figure 3:
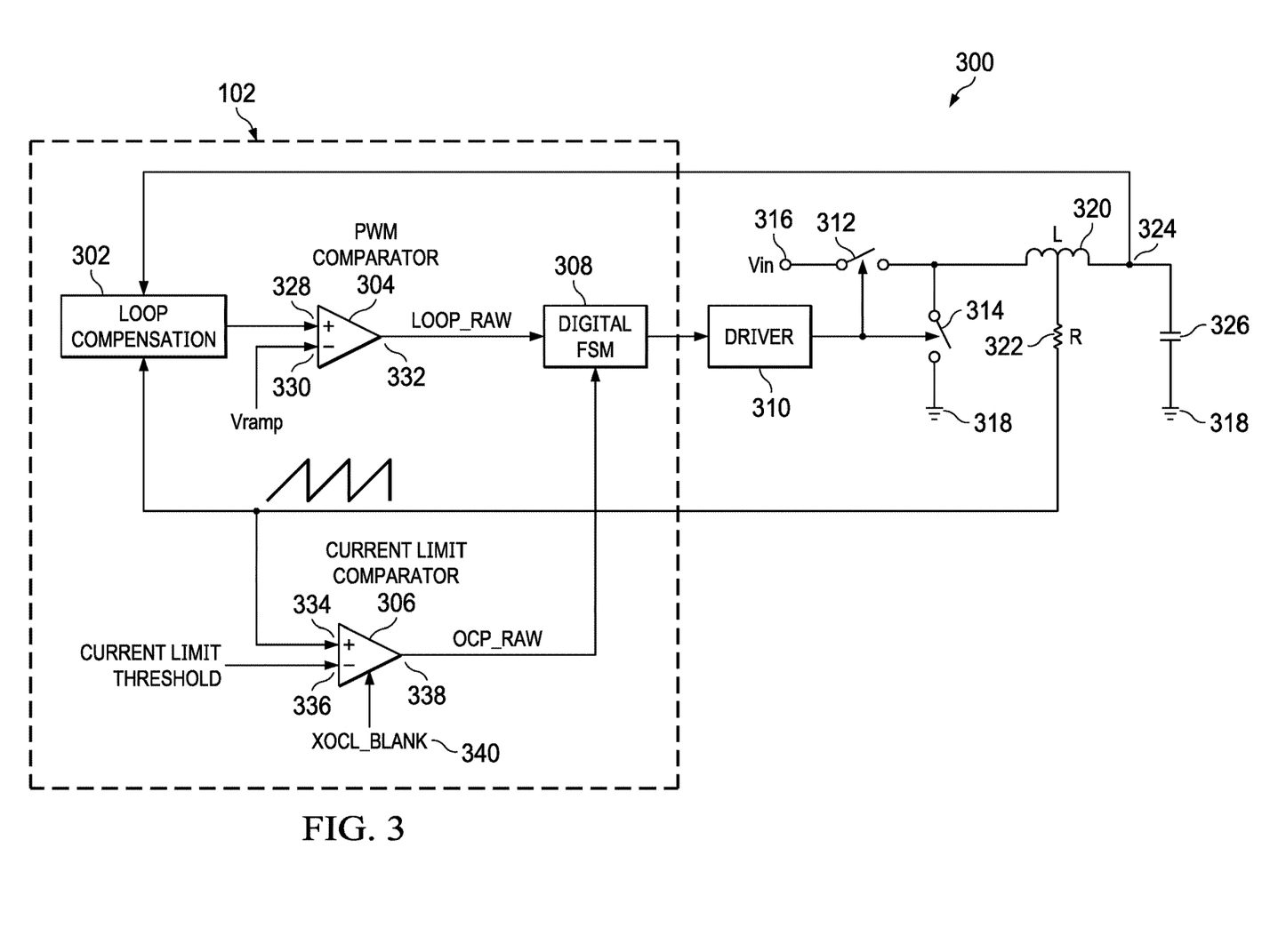
FIG. 3 is a system for a switching voltage regulator with a finite state machine (FSM) in accordance with various examples.

FIG. 3 is a system 300 for a switching voltage regulator with an FSM in accordance with various examples herein.

System 300 includes loop compensation 302, a PWM comparator 304, a current limit comparator 306, a digital FSM 308, and a driver 310. System 300 also includes switches 312 and 314 coupled to driver 310. Switch 312 is coupled to voltage node 316 that provides $V_{in}$. Switch 314 is coupled to ground 318. System 300 also includes inductor 320, resistor 322, node 324, and capacitor 326. Some components of system 300 may be inside a controller, such as controller 102 in one example. In other examples, driver 310 may be within a controller 102 as well.

PWM comparator 304 includes a first input 328 coupled to loop compensation 302 and a second input 330 coupled to a voltage source that provides a $V_{ramp}$ voltage. PWM comparator 304 has an output 332 that is coupled to digital FSM 308. Current limit comparator 306 includes a first input 334 coupled to loop compensation 302 and resistor 322, and a second input 336 that provides a current limit threshold value. Current limit comparator 306 includes an output 338 coupled to digital FSM 308. Current limit comparator 306 also includes a third input 340 that receives an XOCL signal. The XOCL signal forces the output of current limit comparator 306 to a known state. Digital FSM 308 sends the XOCL signal to current limit comparator 306 to indicate that a low output signal from current limit comparator 306 has been received at digital FSM 308 and current limit comparator 306 can therefore switch the signal at output 338 to a default high signal.

In system 300, loop compensation 302 senses the inductor current through resistor 322 and senses the output voltage $V_{out}$ from node 324. Those values are passed through a compensation network within loop compensation 302 and then a signal is provided to PWM comparator 304 at first input 328. PWM comparator 304 compares the signal from loop compensation 302 to a $V_{ramp}$ voltage signal (at second input 330) and provides an output signal called LOOP_RAW in examples herein. LOOP_RAW is provided to digital FSM 308. LOOP_RAW is an active low signal in this example.

PWM comparator 304 is a loop compensation comparator and operates as follows. As load current increases, $V_{out}$ decreases as described above with respect to FIG. 2A. The signal from loop compensation 302 that is provided to PWM comparator 304 at first input 328 also drops if $V_{out}$ drops. Therefore, if $V_{out}$ drops (e.g., if load current increases), PWM comparator 304 is more likely to produce a LOOP_RAW signal at its output 332 than if $V_{out}$ is high. These LOOP_RAW signals are produced more frequently because the signal at first input 328 will be below the $V_{ramp}$ signal at second input 330 more frequently, and the PWM comparator 304 will produce a LOOP_RAW signal each time that condition is met. More LOOP_RAW signals from PWM comparator 304 will create more PWM pulses, as long as current limit comparator 306 continues producing OCP_RAW signals (e.g., if the inductor current is below the current limit threshold at second input 336). In this manner, a lower $V_{out}$ (e.g., if load current is high) produces more PWM pulses than a higher $V_{out}$. As one example, FIGS. 2A and 2C show more PWM pulses produced as $V_{out}$ drops responsive to an increased load current.

Current limit comparator 306 senses the inductor current through resistor 322 at first input 334. Current limit comparator 306 compares the inductor current to a current limit threshold value at second input 336. The current limit comparator 306 operates to ensure the inductor current does not exceed the threshold value. Exceeding the threshold value may damage components in the switching voltage regulator. The output of current limit comparator 306 at output 338 is a signal called OCP_RAW. OCP_RAW is also an active low signal. OCP_RAW is provided to digital FSM 308. Digital FSM 308 provides a signal to driver 310 after both LOOP_RAW and OCP_RAW have gone low.

Figure 4:
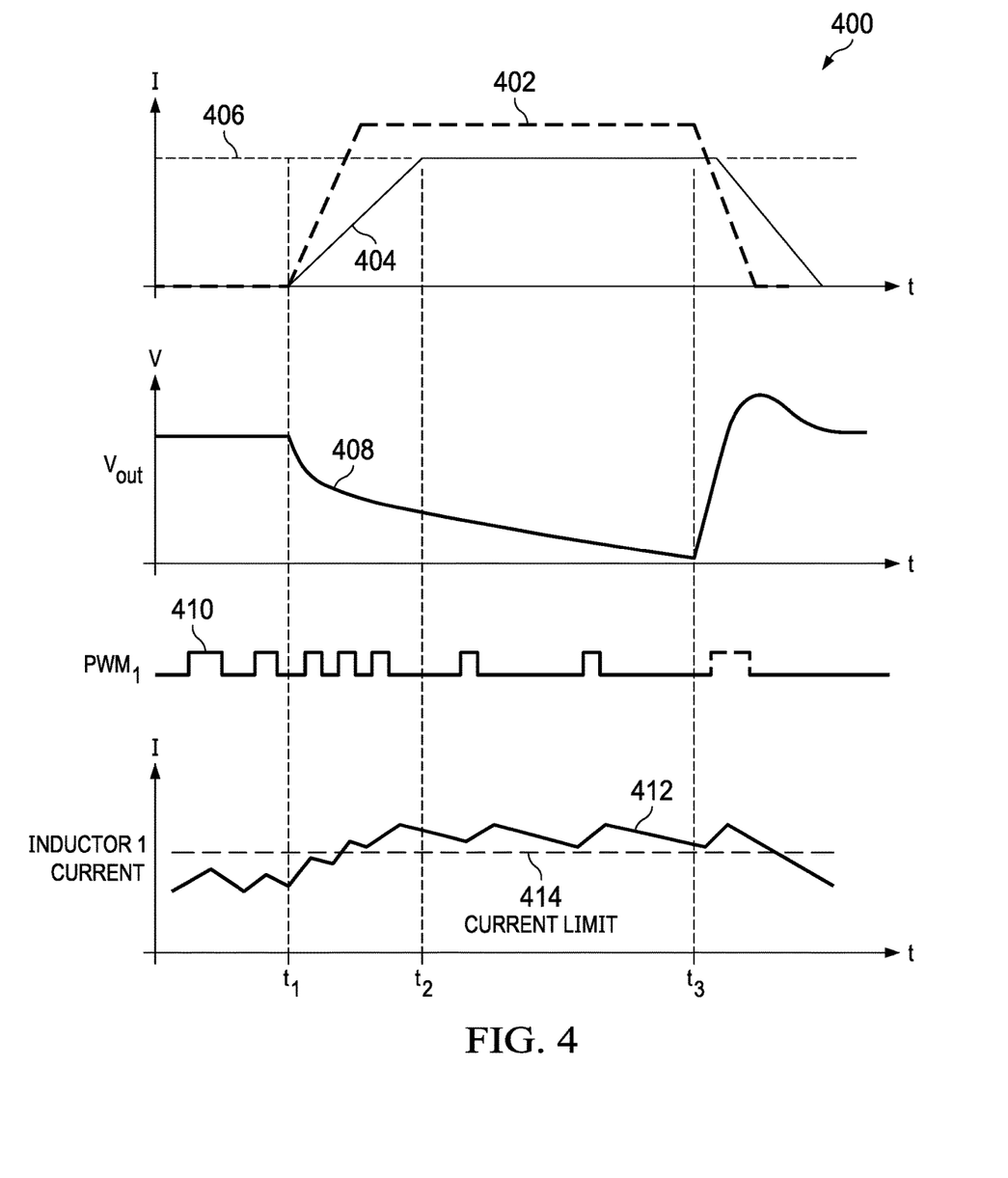
FIG. 4 is a collection of waveforms in accordance with various examples.

FIG. 4 is a collection of waveforms 400 in accordance with various examples herein. Waveform 402 represents the load current. Waveform 404 represents the total inductor current (e.g., within system 100). A dashed horizontal line 406 represents the current limit. In some examples, a valley mode current limit is useful, where the limit is set to the valley of the inductor current. In other examples, an average or peak mode detection may also be useful in various switching converters. Waveform 408 represents the output voltage $V_{out}$. Waveform 410 is an example PWM signal provided by a controller, such as controller 102. Waveform 412 represents the current through a first inductor, such as inductor 106.1 A dashed horizontal line 414 represents the current limit.

FIG. 4 shows an example of how PWM signals are stored and/or removed based on the operation of the voltage converter. Before time $t_1$, PWM pulses are provided as shown in waveform 410, and inductor current (waveform 412) rises as each PWM pulse is fired. After time $t_1$, the load current increases (waveform 402), and $V_{out}$ decreases (waveform 408). At this time, more energy should be provided to the output of the voltage converter because the load requirements have increased, so the PWM pulses are fired at a higher frequency between times $t_1$ and $t_2$. The indication that more energy is provided to the output is stored by the FSM 116 or controller 102, which creates pending PWM pulses. Pending PWM pulses are stored to ensure that if a load step occurs, a delay in firing PWM pulses is avoided.

At about time $t_2$, the PWM frequency is limited by the current limit. The inductor current (waveform 412), is above the current limit represented by dashed horizontal line 414. After time $t_2$, the system is operating in current limit mode. In current limit mode, the PWM frequency is limited. As shown with respect to waveform 410, the PWM pulses are less frequent after time $t_2$ than before time $t_2$. In current limit mode, the controller limits the energy provided to the output to prevent damage to the power FETs, inductors, and other components. To limit the energy, the pending PWM pulses are no longer stored in the current limit mode. No longer storing this information helps to prevent overshoot of the output voltage $V_{out}$.

At time $t_3$, the load current decreases, and $V_{out}$ begins to increase. If pending PWM information were still being stored, a PWM pulse may be produced after time $t_3$. Waveform 410 shows this potential PWM pulse as a dotted pulse after time $t_3$. However, in this example the extra PWM pulse after time $t_3$ is eliminated due to no longer storing pending PWM pulses. Therefore, that PWM pulse is not produced, in accordance with examples herein. The FSM 116 may perform special handling to prevent this PWM pulse.

In examples herein, a signal may determine whether more energy should be provided to the output of the voltage converter. In one example, this signal is the firing of PWM pulses. Also, a methodology is useful to limit the maximum current to a specified limit, which is referred to as current limit mode. Examples herein may detect that the system is in a current limit mode and may also detect overshoots. Responsive to these detections, actions may be taken to prevent overshoots and other undesirable conditions.

In the examples described herein, the LOOP_RAW and OCP_RAW signals may be stored, deleted, ignored, or otherwise manipulated to improve the transient response of the switching voltage regulator. The examples below describe various FSM techniques responsive to the three scenarios described above.

Figure 5A:
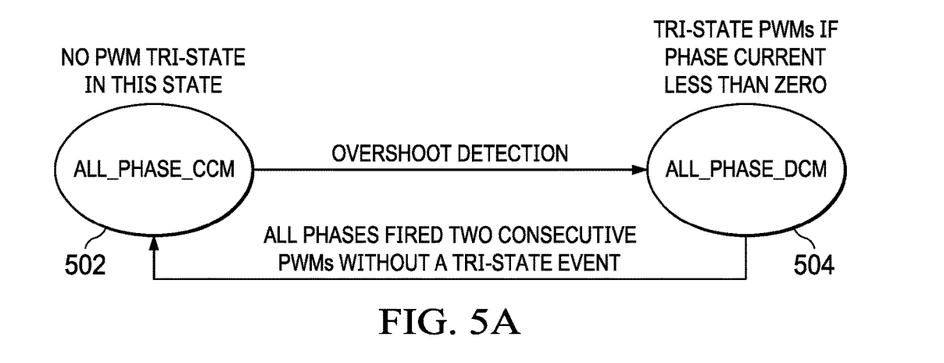
FIGS. 5A and 5B are FSM techniques for limiting overshoot in accordance with various examples.
Figure 5B:
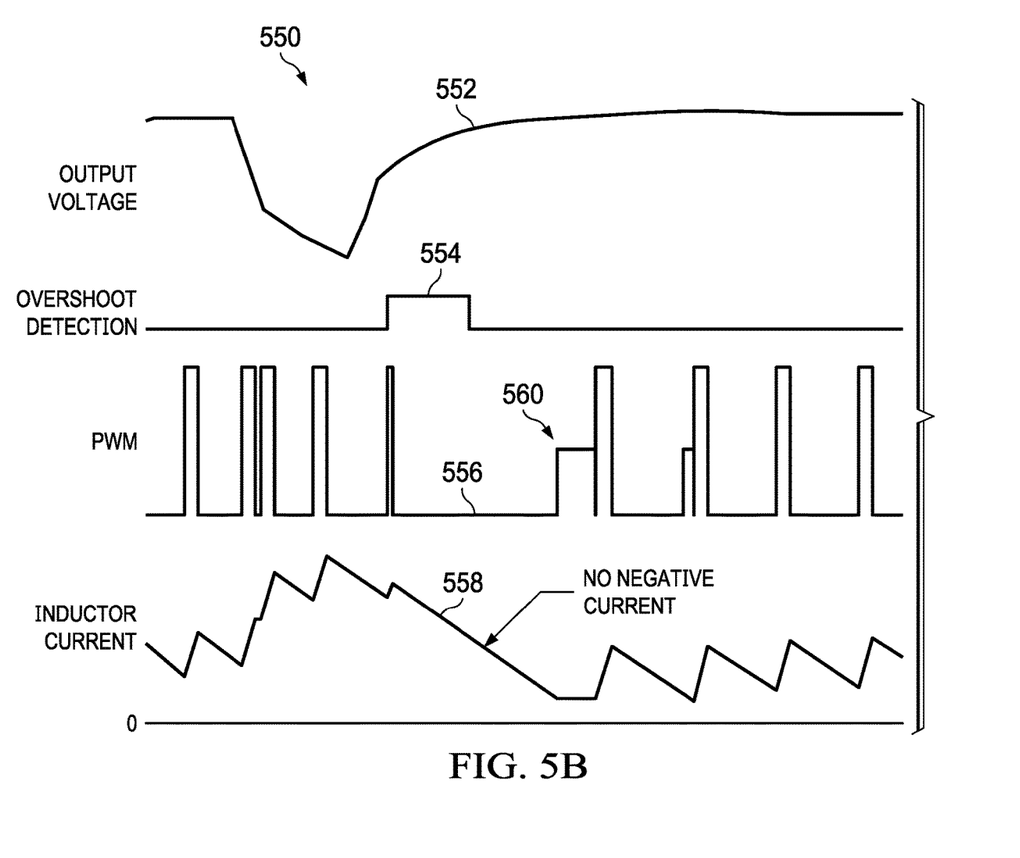

FIGS. 5A and 5B show FSM techniques for limiting overshoot in accordance with various examples herein. In a multiphase switching voltage regulator, negative currents may have undesirable effects as described above. An overshoot detection comparator in the controller 102 indicates that an overshoot has occurred. If an overshoot has occurred and the current in a phase reaches zero, the PWM is tri-stated to help prevent negative currents.

FIG. 5A shows two states of a state machine such as digital FSM 308. State 502 is continuous conduction mode (CCM). In CCM, no PWM pulses are in tri-state. If an overshoot is detected, the state machine transitions to state 504. State 504 is discontinuous conduction mode (DCM). In DCM, PWM pulses are tri-stated if the current reaches zero amps. The PWM pulses are tri-stated by turning off both the high-side FET and the low-side FET in the switching voltage regulator. Negative currents are clipped to zero if the PWM pulses are tri-stated. If the system is in DCM, the system leaves DCM by the controller 102 recognizing two consecutive PWM pulses without a tri-state PWM pulse in between. If that occurs, the state machine returns to state 502.

FIG. 5B includes waveforms 550 that show the phenomenon described in FIG. 5A. Waveform 552 represents the output voltage and waveform 554 represents the overshoot detection comparator. Waveform 556 shows the PWM pulses, and waveform 558 represents the inductor current. As shown in FIG. 5B, the output voltage in waveform 552 drops and inductor current in waveform 558 begins to rise. After the output voltage begins to rise, the overshoot detector comparator indicates the overshoot has been detected and waveform 554 goes high. The controller 102 moves to state 504 (DCM) if the overshoot detector goes high. Also, if the inductor current reaches zero amps while in DCM, the PWM is tri-stated. A PWM tri-state 560 is shown as one example.

Figure 6:
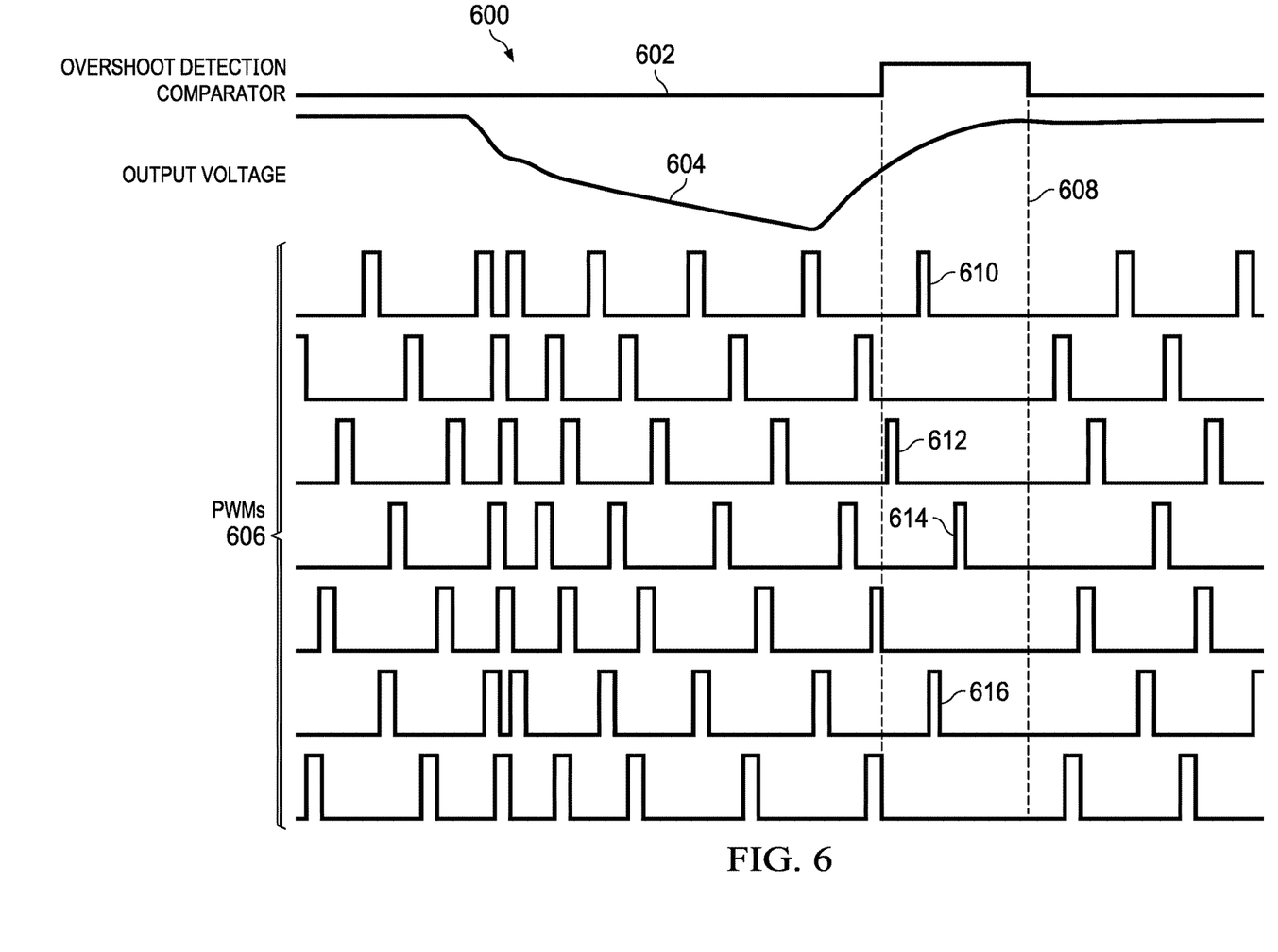
FIG. 6 is a collection of waveforms for active pulse truncation in accordance with various examples.

FIG. 6 is a collection of waveforms 600 for active pulse truncation in accordance with various examples herein. Waveform 602 represents the overshoot detection comparator. Waveform 604 is the output voltage, and waveforms 606 are the PWM pulses for the phases of a multiphase switching voltage regulator. Window 608 shows a selection of truncated PWM pulses, which are labeled 610, 612, 614, and 616. As described above, multiphase switching voltage regulators may use an overshoot detection comparator to limit overshoot of the output voltage in one example. Any suitable method of detecting the overshoot may be useful in the examples herein. For example, the output voltage may be digitized and a digital FSM is useful to detect overshoots. During overshoot scenarios, controllers (e.g., controller 102) can tri-state the PWM pulses, truncate PWM pulses, prevent firing of PWM pulses, or remove PWM pulses. However, some of these actions may cause an undershoot of the output voltage, which increases the time it takes for the output voltage to reach its final programmed value. The controller may provide more PWM pulses to prevent the undershoot. However, if normal PWM pulses are provided the controller may create an overshoot.

In examples herein, if the overshoot comparator is high, the control loop is not prevented from providing PWM pulses. Rather, the on-time of the PWM pulses is altered. For example, if a normal PWM pulse has a 200 ns on-time, the PWM pulses during the overshoot situation are truncated to a lesser amount, such as 60 ns. The lower on-time is programmable and may be changed based on the specifics of the load or on the feedback from the load. The truncated on-time value may be stored in the controller 102 in one example. In this example, pulses 610, 612, 614, and 616 are truncated PWM pulses from various phases that are truncated due to the overshoot detection being high during window 608. Truncating the PWM pulses helps to prevent undershoot of the output voltage during periods where the overshoot detection comparator is high.

Figure 7:
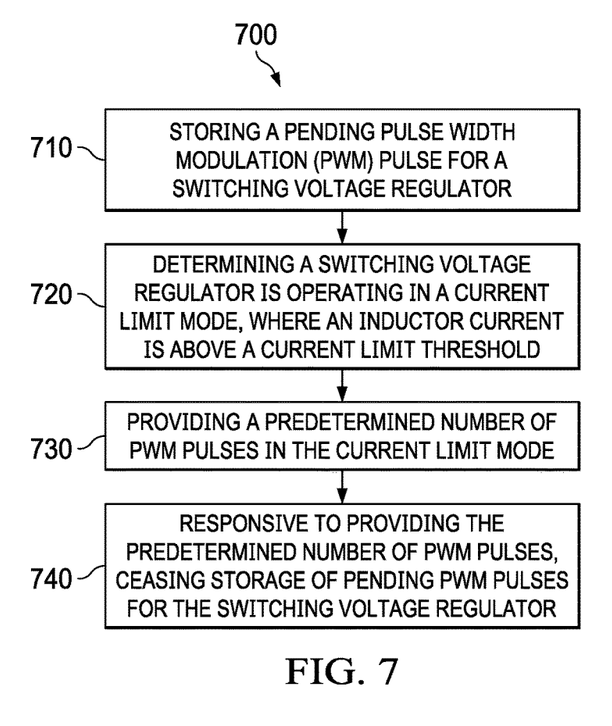
FIG. 7 is a flow diagram of a method for preventing overshoot of an output voltage in a switching voltage regulator in accordance with various examples.

FIG. 7 is a flow diagram of a method 700 for preventing overshoot of an output voltage in a switching voltage regulator in accordance with various examples herein. The steps of method 700 may be performed in any suitable order. The hardware components described above with respect to FIGS. 1 and 3 may perform method 700 in some examples.

Method 700 begins at 710, where a pending pulse width modulation (PWM) pulse is stored for a switching voltage regulator. As described above, pending PWM pulses are stored to provide the extra PWM pulses in the event that a load increase occurs, to avoid a delay in providing PWM pulses.

Method 700 continues at 720, where a controller such as controller 102 determines that a switching voltage regulator is operating in a current limit mode, where an inductor current is above a current limit threshold. In one example, controller 102 may determine that the switching voltage regulator is in current limit mode if the PWM pulses are provided responsive to OCP_RAW signals. If PWM pulses are provided responsive to OCP_RAW signals rather than LOOP_RAW signals, the regulator is operating in current limit mode. In other examples, controller 102 may determine that the switching voltage regulator is in current limit mode using any suitable method. In one example, if a comparator determines that the inductor current is above a predetermined threshold, the system is operating in current limit mode.

Method 700 continues at 730, where controller 102 provides a predetermined number of PWM pulses in the current limit mode. The predetermined number may be set by controller 102 or an FSM 116, and may vary in some examples.

Method 700 continues at 740, where, responsive to providing the predetermined number of PWM pulses, controller 102 ceases storage of pending PWM pulses for the switching voltage regulator. By ceasing the storage of pending PWM pulses, PWM pulses may not be provided after the load current drops, which reduces the chances of an overshoot of the output voltage.

Figure 8:
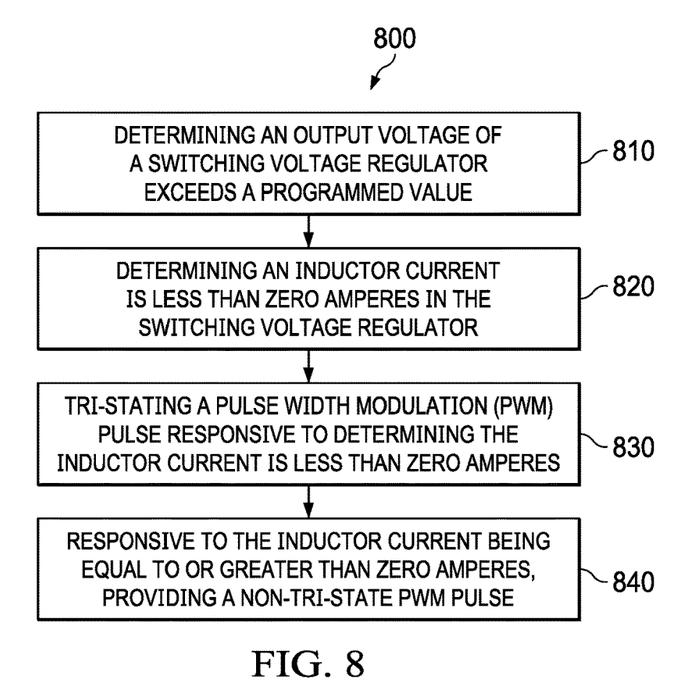
FIG. 8 is a flow diagram of a method for tri-stating PWM pulses in a switching voltage regulator in accordance with various examples.

FIG. 8 is a flow diagram of a method 800 for tri-stating PWM pulses in a switching voltage regulator in accordance with various examples herein. The steps of method 800 may be performed in any suitable order. The hardware components described above with respect to FIGS. 1 and 3 may perform method 800 in some examples.

Method 800 begins at 810, where a controller, such as controller 102, determines that an output voltage of a switching voltage regulator exceeds a programmed value. The output voltage exceeding a programmed value indicates that the switching voltage regulator is in an overshoot condition.

Method 800 continues at 820, where a controller such as controller 102, determines that an inductor current is less than zero amperes in a switching voltage regulator. Negative currents may cause damage, so examples herein operate to reduce or prevent negative currents.

Method 800 continues at 830, where controller 102 tri-states a PWM pulse responsive to determining the inductor current is less than zero amperes. In one example, the PWM pulses are tri-stated by turning off both the high-side FET and the low-side FET in the switching voltage regulator. Negative currents are clipped to zero if the PWM pulses are tri-stated.

Method 800 continues at 840, where, responsive to the inductor current being equal to or greater than zero amperes, controller 102 provides a non-tri-state PWM pulse. In one multiphase example, the tri-state PWM mode continues until all of the phases have provided two consecutive PWM pulses without a tri-state pulse in-between. Responsive to that condition, the tri-state mode may end, and the normal PWM mode may resume.

Figure 9:
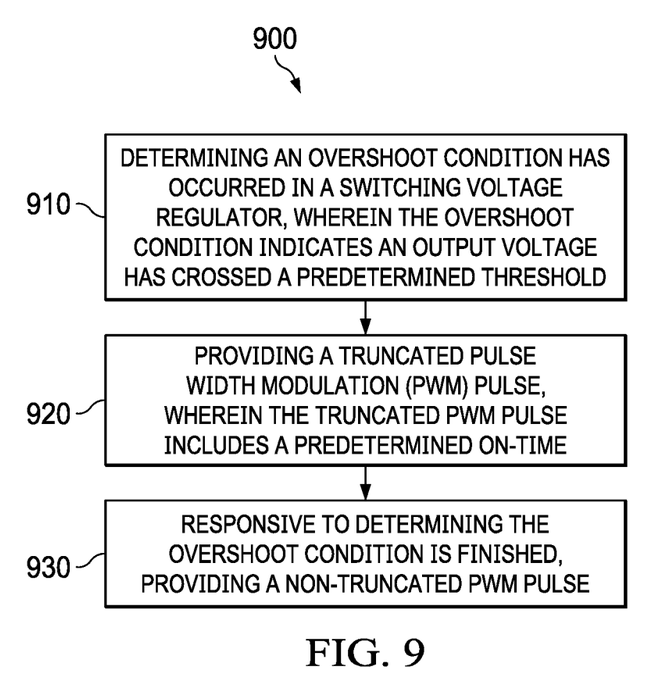
FIG. 9 is a flow diagram of a method for providing truncated PWM pulses in a switching voltage regulator in accordance with various examples.

FIG. 9 is a flow diagram of a method 900 for providing truncated PWM pulses in a switching voltage regulator in accordance with various examples herein. The steps of method 900 may be performed in any suitable order. The hardware components described above with respect to FIGS. 1 and 3 may perform method 900 in some examples.

Method 900 begins at 910, where a controller, such as controller 102, determines an overshoot condition has occurred in a switching voltage regulator, and where the overshoot condition indicates an output voltage has crossed a predetermined threshold. An overshoot detection comparator is useful in some examples to determine the overshoot condition, as described above.

Method 900 continues at 920, where controller 102 provides at least one truncated PWM pulse, where the truncated PWM pulse includes a predetermined on-time. For example, if a normal PWM pulse has a 200 ns on-time, the PWM pulses during the overshoot situation are truncated to a lesser amount, such as 60 ns. The lower on-time is programmable and may be changed based on the specifics of the load or on the feedback from the load. The truncated on-time value may be stored in the controller 102 in one example.

Method 900 continues at 930, where, responsive to determining the overshoot condition is finished, controller 102 provides a non-truncated PWM pulse. Controller 102 may determine that the overshoot condition is finished by using an overshoot detection comparator in some examples.

In examples herein, selectively storing and/or removing pending PWM generation signals (such as LOOP_RAW signals) is performed to prevent overshoots. Also, tri-stating PWM pulses may be performed to help prevent negative currents in the switching voltage regulator. In some examples, active pulse truncation of PWM pulses is performed to improve transient performance and prevent both overshoots and undershoots.

The term "couple" is used throughout the description. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
    a controller;
    a power stage coupled to the controller; and
    an inductor coupled to the power stage;
    wherein the controller is configured to:
        store a pending pulse width modulation (PWM) pulse;
        determine an inductor current of the inductor is above a current limit threshold;
        provide the pending PWM pulse a predetermined number of times; and
        responsive to providing the pending PWM pulse the predetermined number of times, cease storage of the pending PWM pulse.

2. The system of claim 1, wherein the controller is configured to provide the pending PWM pulse in a current limit mode responsive to an output of a current limit comparator.

3. The system of claim 2, wherein the controller is configured to store the pending PWM pulse responsive to exiting the current limit mode.

4. The system of claim 1, wherein the controller is configured to provide the pending PWM pulse responsive to a signal from a current limit comparator and a signal from a loop compensation comparator.

5. The system of claim 1, wherein the power stage includes multiple phases, and wherein each of the multiple phases provides the PWM pulse the predetermined number of times.

6. The system of claim 5, wherein the controller is configured to store the pending PWM pulse for each of the multiple phases.

7. The system of claim 6, wherein the controller is configured to cease storage of the pending PWM pulse for each of the multiple phases.

8. The system of claim 7, wherein the controller is configured to resume storing the pending PWM pulse in response to termination of a current limit mode.

9. A voltage regulator, comprising:
a compensation circuit including an output;
a first comparator coupled to the output of the compensation circuit;
a second comparator; and
a control circuit coupled to an output of the first comparator and an output of the second comparator; wherein:
the compensation circuit determines an output voltage of the voltage regulator exceeds a programmed value;
the second comparator indicates at the output of the second comparator one of an inductor current is less than zero amperes in the voltage regulator and the inductor current is equal to or greater than zero amperes;
the control circuit is configurable to tri-state a pulse width modulation (PWM) pulse responsive to the second comparator indicating the inductor current is less than zero amperes; and
the control circuit is configurable to provide a non-tri-state PWM pulse responsive to the second comparator indicating the inductor current is equal to or greater than zero amperes.

10. The voltage regulator of claim 9, wherein the voltage regulator is a multiphase switching voltage regulator, and wherein the inductor current is determined for each phase.

11. The voltage regulator of claim 10, wherein the voltage regulator is a multiphase switching voltage regulator, and wherein the PWM pulse is tri-stated for each phase responsive to determining an inductor current is less than zero amperes.

12. The voltage regulator of claim 10, wherein tri-stating the PWM pulse is performed for one phase of the multiphase switching voltage regulator.

13. The voltage regulator of claim 9, wherein tri-stating the PWM pulse includes turning off a high-side field effect transistor (FET) and a low-side FET of the voltage regulator.

14. The voltage regulator of claim 9, includes a discontinuous conduction mode responsive to determining the output voltage exceeds the programmed value and determining the inductor current is less than zero amperes.

15. The voltage regulator of claim 14, wherein responsive to determining the inductor current is equal to or greater than zero amperes, the voltage regulator exits the discontinuous conduction mode.

16. A system, comprising:
a driver; and
a controller coupled to the driver, wherein the controller is configured to:
determine an overshoot condition has occurred in a switching voltage regulator, wherein the overshoot condition indicates an output voltage has crossed a predetermined threshold;
provide a truncated pulse width modulation (PWM) pulse, wherein the truncated PWM pulse includes a predetermined on-time; and
responsive to determining the overshoot condition is finished, provide a non-truncated PWM pulse.

17. The system of claim 16, wherein the truncated PWM pulse has a shorter on-time than the non-truncated PWM pulse.

18. The system of claim 16, wherein the predetermined on-time is based at least in part by feedback from a load.

19. The system of claim 16, wherein the switching voltage regulator is a multiphase switching voltage regulator, and PWM pulses are provided for each phase.

20. The system of claim 19, further comprising providing the truncated PWM pulse for each phase of the multiphase switching voltage regulator during the overshoot condition.

* * * * *